United States Patent
Wolf

(10) Patent No.: US 8,005,359 B2
(45) Date of Patent: Aug. 23, 2011

(54) NETWORK ELEMENT FOR SIGNALS OF THE OPTICAL TRANSPORT NETWORK (OTN)

(75) Inventor: Michael Joachim Wolf, Mundelsheim (DE)

(73) Assignee: Alcatel Lucent, Paris (FR)

( * ) Notice: Subject to any disclaimer, the term of this patent is extended or adjusted under 35 U.S.C. 154(b) by 1416 days.

(21) Appl. No.: 10/198,983

(22) Filed: Jul. 22, 2002

(65) Prior Publication Data
US 2003/0016416 A1     Jan. 23, 2003

(30) Foreign Application Priority Data
Jul. 23, 2001   (EP) .................................... 01440232

(51) Int. Cl.
*H04J 14/00* (2006.01)
(52) U.S. Cl. ........................................................ 398/52
(58) Field of Classification Search .................... 398/45, 398/52, 55, 56
See application file for complete search history.

(56) References Cited

U.S. PATENT DOCUMENTS

| | | | |
|---|---|---|---|
| 4,935,921 A | 6/1990 | Ishizaki et al. | |
| 5,335,223 A * | 8/1994 | Iino | 370/503 |
| 5,442,647 A | 8/1995 | Loebig | |
| 6,188,258 B1 * | 2/2001 | Nakatani | 327/157 |
| 6,628,651 B1 * | 9/2003 | Ryan et al. | 370/369 |
| 6,804,265 B1 * | 10/2004 | Naumann | 370/504 |
| 6,870,860 B1 * | 3/2005 | Meagher et al. | 370/535 |
| 6,950,215 B2 * | 9/2005 | Fant et al. | 359/16 |
| 2002/0186432 A1 * | 12/2002 | Roorda et al. | 359/128 |

FOREIGN PATENT DOCUMENTS
EP     0368501 A1     5/1990

OTHER PUBLICATIONS

"SONET: Fundamentals and Uses" presented by Tracy A. Cox, Aug. 14, 1991.*
ITIU-T G.709 dated Feb. 2001—Series G. Transmission Systems and Media, Digirtal Systems and Networks—Interface for the Optical Transport Network (OTN) XP-002195641—International Telecommunication Union.
ITU-T G.709/Y.1331—Feb. 2201—Series G: Transmission Systems and Media Digital Systems and Networks— Interfaces for the Optical Transport Network (OTN).

* cited by examiner

*Primary Examiner* — Shi K Li
(74) *Attorney, Agent, or Firm* — Sughrue Mion, PLLC

(57) ABSTRACT

A crossconnect for asynchronous OTN signals operates synchronously internally at an internal clock rate. Received OTN signals are synchronized to an internal frame format by stuffing. The synchronized signals are parallelized and switched with a switching matrix comprising synchronously operating integrated circuits that operate at the internal clock rate. At the output, the synchronized signals are again destuffed and are transmitted again at the original bit rate.

13 Claims, 1 Drawing Sheet

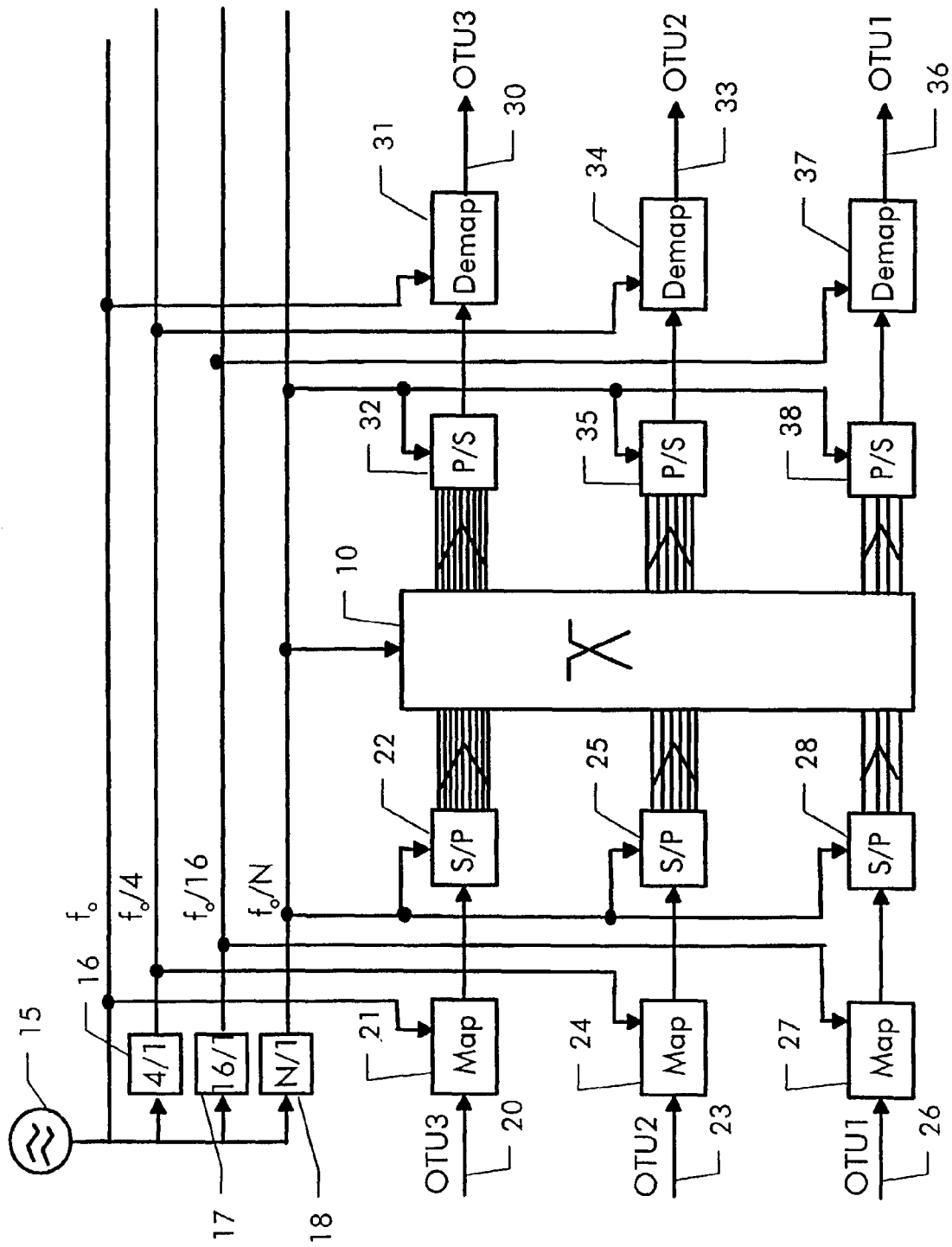

NETWORK ELEMENT FOR SIGNALS OF THE OPTICAL TRANSPORT NETWORK (OTN)

The invention is based on a priority application EP 01 440 232.5 which is hereby incorporated by reference.

FIELD OF THE INVENTION

The invention relates to a network element for asynchronous optical communications signals that have been assembled in accordance with a multiplex specification for optical transport networks (OTNs).

BACKGROUND OF THE INVENTION

The International Telecommunication Union has specified interfaces for a new transport network having the designation OTN (optical transport network) in its new recommendations ITU-T G.709 (Prepublished Recommendation, February 2001) which is incorporated by reference herein. Said new transport network serves the high-speed transmission of digital optical signals in future WDM (wavelength-division multiplex) networks. In contrast to previous transport networks, such as SDH (synchronous digital hierarchy) networks and SONET (synchronous optical network), OTN operates with substantially asynchronous optical signals. This means that the individual communications signals are not synchronized to a common network timing and may have different bit rates within a specified range (±20 ppm).

For said novel transport network, network elements now have to be developed that are capable of switching the newly specified communications signals. Said network elements are, in particular, optical crossconnects and add/drop multiplexers. The essential feature of such network elements is a switching matrix that switches communications signals from any to any port in an arbitrary controlled manner.

Since OTN is an optical transport network, the use of a purely optical switching matrix would suggest itself in network elements. Such a matrix makes it possible to switch so-called OTUk signals (optical channel transport unit, k=1, 2 or 3). Such OTUk signals are characterized by their frame structure, bit rate and bandwidth. At present, available, purely optical switching matrices require, however, a number of optical amplifiers and repeaters and are therefore technically very complex and expensive, they suffer from limited capacity and reliability and they are bulky. In addition, it will be necessary to evaluate and to terminate certain information in the transport frames of the communications signals, which inevitably requires electrical processing.

Alternatively, an asynchronous electrical switching matrix is suitable, i.e. a switching matrix that is made up of a multiplicity of electrical switching circuits which make it possible to switch electrical signals of any bit rate in a certain bandwidth range. Such integrated circuits are, however, only being developed and are at present not yet available. The high bit rates of the OTN signals (2.67 Gbit/sec, 10.71 Gbit/sec and 43.12 Gbit/sec) present the development of such synchronously operating integrated circuits with major technical problems.

SUMMARY OF THE INVENTION

The object of the present invention is therefore to specify a network element for switching asynchronous optical communications signals, which network element can be easily and reliably implemented with current means.

The object is achieved by a network element for asynchronous optical communications signals that are assembled in accordance with a multiplex specification and have a bit rate within a specified bit-rate range. The network element has O/E converters for converting received optical signals into electrical signals, stuffing devices for adapting the bit rates of the electrical signals to an integral multiple of an internal clock rate that is higher than the upper limit of the specified bit-rate range, serial/parallel converters for converting the stuffed signals into a specified number of parallel signals having the internal clock rate, and a synchronous electrical switching matrix that operates at the internal clock rate for switching the parallel signals from any to any port.

Advantageous refinements are to be found in the dependent claims.

Advantages of the invention are that it makes use of ASIC technology that has been tried and tested over many years and can therefore be immediately made ready for the market and that it makes possible a fractional switching of signals of higher bit rates. It is even possible to upgrade existing installations for OTN in accordance with the invention without a new type of matrix having to be incorporated. A particular advantage is, in addition, that the invention makes possible a hit-less switch-over between redundant matrix assemblies.

BRIEF DESCRIPTION OF THE DRAWINGS

The invention is explained below by reference to the sole FIGURE in an exemplary embodiment. The FIGURE shows a block circuit diagram of a network element according to the invention.

DETAILED DESCRIPTION OF THE INVENTION

A basic idea of the invention is to synchronize the received asynchronous communications signals to an internal frame format having a slightly higher internal clock rate by stuffing. The signals thus synchronized are parallelized and switched with a standard switching matrix comprising synchronously operating integrated circuits that operate at the internal clock rate.

An optical crossconnect operating according to this principle is shown diagrammatically in the FIGURE. The received optical communications signals are converted (not shown) by O/E converters into electrical signals 20, 23, 26 and fed to a stuffing device 21, 24, 27 herein referred to as mappers. The mappers are each connected to serial/parallel converters 22, 25, 28. The serial/parallel converters are connected via parallel connections to a synchronously operating electrical switching matrix 10. At the output, the switching matrix 10 is followed again by parallel/serial converters 32, 35, 38 that are each connected to a destuffing device 31, 34, 37 herein referred to as a demapper. The output signals of the demappers are asynchronous communications signals 30, 33, 36 having the original bit rate again. The electrical output signals 30, 33, 36 are then converted into optical communications signals in E/O converters (not shown) and fed into the optical transport network.

The FIGURE shows, by way of example, only one input and one output for each multiplex level (OTU1, OTU2, OTU3). In reality, however, the crossconnect has a multiplicity of inputs and outputs for each of the multiplex levels. The mappers and demappers shown as spatially separated in the FIGURE may also be disposed in pairs on a respective I/O card.

The optical crossconnect has a timing system with an oscillator 15 whose output clock $f_0$ is fed to a plurality of dividers.

The undivided clock (corresponding to a divider ratio of 1/1) is fed to the third mapper 21 and demapper 31. A first divider 16 having a divider ratio of 4/1 generates a clock signal $f_0/4$ that has one quarter of the original clock rate and is fed to the second mapper and demapper 24, 34. A second divider 17 that has a divider ratio of 16/1 generates a clock signal $f_0/16$ that has a $16^{th}$ of the original clock rate and is fed to the first mapper and demapper 27, 37. A third divider 18 having a divider ratio of N/1 generates a clock signal $f_0/N$ which is fed to the serial/parallel converters 22, 25, 28, the parallel/serial converters 32, 35, 38 and the switching matrix 10. N is equal to 16 times the parallelization factor of the serial/parallel converter 28. The clock signal $f_0/N$ provides the internal clock rate at which the matrix operates.

For the invention it is not necessary that a true clock division take place. On the contrary, a suitable gapped clock also fulfils the requirements. Thus, a 4:1 divider can be designed so that it allows through only every fourth clock pulse and blocks the other three clock pulses in each cycle.

The function of the optical crossconnect is as follows. The frequency of the oscillator 15 is $43.02+\epsilon$ GHz, where $\epsilon$ is the value to be chosen by which the internal clock frequency is higher than the maximum bit rate of the received asynchronous signals. The frame format and $\epsilon$ are chosen in such a way that the resultant stuffing rate is between 0 and 1.

The first mapper 27 receives a communications signal of the lowest OTN hierarchy level. This is described as OTU1 (optical channel transport unit) and has a nominal bit rate of 2.7 Gbit/sec. The oscillator frequency is divided by 16 in order to generate a clock signal $f_0/16$ having a slightly higher clock rate. The OTU1 signal is synchronized to this clock rate. For this purpose, an internal proprietary frame format is formed from the OTU1 signal by filling it up to the clock rate of the clock signal $f_0/16$ by stuffing. Additional bit positions of this internal frame format indicate the start of the frame and how many stuffing bits are attached to the data signal. The stuffing can be performed bitwise or bytewise and can operate both according to the positive/zero/negative stuffing method and according to the positive stuffing method. Positive stuffing, however, is preferred here since it results in lower stuffing jitter.

The synchronized internal signals are then parallelized with the serial/parallel converter 28 and fed to the switching matrix 10. In the exemplary embodiment shown, the synchronized internal signal, which corresponds to the multiplex level OTU1, is parallelized four-fold. The internal clock rate at which the integrated circuits of the switching matrix operate is consequently 670 MHz. The clock frequency for switching matrix 10 and serial/parallel converter is generated by dividing the frequency of the oscillator by 64, i.e. N=64 in the FIGURE.

For the multiplex level OTU2, the frequency of the oscillator is divided by 4 and fed to the mapper 24 in order to synchronize the received OTU2 signal thereto. The synchronized signal is then parallelized sixteen-fold in the serial/parallel converter 25 and fed to the switching matrix 10 via 16 connections.

For the multiplex level OTU3, the frequency of the oscillator is fed undivided to the mapper 21 and the received OTU3 signal is synchronized thereto. The synchronized signal is parallelized sixty-four-fold in the serial/parallel converter 22 and fed to the switching matrix 10 via 64 connections.

The parallelized internal signals are switched on parallel paths through the switching matrix 10, i.e. for an OTU1 signal, 4 paths are switched through the matrix, for an OTU2 signal, 16 are switched and for a OTU3 signal, 64 are switched.

The oscillator 15 may be an oscillator having a precision of ±20 ppm or less. Since the bandwidth specified for OTN is ±20 ppm, a frequency difference of ±40 ppm would have to be made up for by stuffing in the most unfavorable case. If a correspondingly more precise oscillator were used, it would still be at least ±20 ppm. Synchronization of the oscillator to an external clock is unnecessary, but may be performed, for example, to synchronize all the network elements of a network node to the same internal clock.

The switching matrix 10 comprises integrated circuits, known per se, that operate and switch synchronously at the internal clock rate. The integrated circuits may, for example, be ASICs (application specific integrated circuits), which, according to matrix size, are arranged to form a square matrix or to form a three-stage or multi-stage Clos matrix.

The function of the demapper is to remove the frames and stuffing bits added in the mapper and to reproduce the communications signals at the original bit rate.

Preferably, the demappers contain a clock filter to filter stuffing jitter.

A multiplicity of modifications of the structure described for the crossconnect are possible, of which the following may not be a final enumeration.

Instead of all the three multiplex levels standardized in G.709, only one or two levels may be supported. Thus, for example, a crossconnect may support only OTU1 or only OTU2 signals or OTU1 and OTU2 signals, but no OTU3 signals.

The switching matrix may operate, for example, at an internal clock rate that corresponds to the clock to which the OTU1 signals are synchronized. The corresponding synchronized internal OTU1 signals are then no longer parallelized, but only the synchronized internal OTU2 and OTU3 signals (degree of parallelization for OTU1 is 1).

The dividers may be cascaded, for example instead of a 16:1 divider, the clock divided by 4 can be divided again by 4.

Instead of a divided clock, a gapped clock can also be generated.

A preferred embodiment of the invention uses the clock rate, well known from SDH network elements, of STM-1 (synchronous transport module) of 155.52 MHz as internal clock for the switching matrix. The parallelization is consequently for STM-1: 1 timeslot
STM-4: 4 timeslots
STM-16: 16 timeslots
STM-64: 64 timeslots
OTU1: 18 timeslots
OTU2: 72 timeslots and for
OTU3: 288 timeslots.

The maximum frequency the oscillator generates is 288*155,520 kHz=44.79 GHz. This is about 5% above the clock rate of OTU3. For electrical processing, this clock rate is near the technical limit. The crossconnect can therefore also be designed for OTU2 and with a maximum clock rate of 72*155,520 kHz=11.20 GHz.

The frame format for OTN signals is chosen as follows: The frame length is 1000 bits; other lengths are, however, equally possible. Part thereof is overhead bits plus a stuffing bit and, to be specific:

For OTU1: 47 overhead bits+1 stuffing bit; the nominal stuffing rate is 0.61905 (min=0.58095, max=0.65714);
For OTU2: 43 overhead bits+1 stuffing bit; the nominal stuffing rate is 0.60056 (min=0.56231, max=0.63882);

For OTU3: 39 overhead bits+1 stuffing bit; the nominal stuffing rate is 0.54802 (min=0.50960, max=0.58643).

Of the overhead bits, 16 bits are used as frame alignment signal, similar to the A1, A2 bytes in the STM-N frame in the case of SDH. The remaining overhead bits are used for stuffing identification and also internal maintenance and monitoring purposes. Unused overhead bits are filled with fixed stuffing bits (fixed stuff).

OTU3 signals are divided into 40 blocks of 24 data bits each and one overhead bit. OTU2 and OTU3 signals are 4 or 8 blocks respectively, to form 23 data bits and 2 overhead bits in each case therefrom. Advantages of this configuration are:
- the frame repetition frequency is high, as a result of which stuffing jitter can be filtered well;
- the overhead bits are uniformly distributed, as a result of which only slight stuffing jitter occurs; and
- internal additional bits are available for maintenance.

If, according to the invention, a positive/zero/negative stuffing method is used to adapt the received communications signals to the internal clock rate, the internal frame format contains a negative stuffing opportunity bit occupied by way of exception with a data bit (negative stuffing) and also a positive stuffing opportunity bit occupied by way of exception with a stuffing bit (positive stuffing).

A further modification of the crossconnect according to the invention is that, in the mappers, instead of the OTUk signals, the ODUk signals (optical channel data unit) contained therein are stuffed to correspondingly lower internal bit rates. OTUk is distinguished from ODUk by an additional OTUk overhead and also bits for FEC (forward error correction). Said additional overhead and FEC bits can be terminated in the mappers and evaluated. The bit rates for ODUk are approximately 2.50 Gbit/sec for ODU1, 10.04 Gbit/sec for ODU2 and 40.32 Gbit/sec for ODU3.

The switching matrix of the network element may be designed in redundant form, i.e. contain an active switching matrix and a redundant switching matrix for the fault condition. In this case, the invention makes possible, because of the internal synchronization, an hit-less switchover between the two copies of the switching matrix.

What is claimed is:

1. A network element for asynchronous optical communications signals that are assembled in accordance with a multiplex specification and have a bit rate within a specified bit-rate range, the network element comprising:
    optical-to-electrical converters for converting received asynchronous optical signals into electrical signals;
    bit stuffing devices for adapting the bit rates of the electrical signals to an integral multiple of an internal clock rate that is higher than the upper limit of the specified bit-rate range;
    serial/parallel converters for converting the bit stuffed signals into a specified number of parallel signals having the internal clock rate; and
    a synchronous electrical switching matrix that operates at the internal clock rate for switching the parallel signals from any to any port.

2. The network element according to claim 1, which is designed as an optical cross connect.

3. The network element according to claim 1, which is designed for optical communication signals in accordance with ITU-T G.709.

4. The network element according to claim 1, the network element having a second redundant switching matrix to which the first switching matrix is switched over in an interruption-free manner in the fault condition.

5. The network element according to claim 1, wherein the internal clock frequency is chosen in such a way that the bit stuffing rate is between 0 and 1.

6. The network element according to claim 1, having a clock generator for generating a clock signal that is an integral multiple of the internal clock rate, and having a divider for generating an internal clock signal.

7. The network element according to claim 6, wherein the clock generator is a free-running oscillator having a frequency position of about ±20 ppm or less.

8. The network element according to claim 6, wherein the clock generator can be externally synchronized.

9. The network element according to claim 6, wherein the divider generates a gapped clock having the internal clock rate by blocking individual clock pulses of the clock signal generated by the clock generator.

10. The network element according to claim 6, the network element comprising:
    first bit stuffing devices for adapting the bit rates of electrical signals of a lower hierarchy level to a first integral multiple including 1 of the internal clock rate; and
    second bit stuffing devices for adapting the bit rates of the electrical signals of a middle hierarchy level to a second integral multiple of the internal clock rate, which is greater than the first multiple.

11. The network element according to claim 10, wherein the lowest multiplex level corresponds to OTU1 and the middle multiplex level to OTU2 in accordance with ITU-T G.709.

12. The network element according to claim 10, further comprising a third bit stuffing device for adapting the bit rates of electrical signals of a highest hierarchy level to a third integral multiple of the internal clock rate that is greater than the second multiple.

13. A method of switching asynchronous optical communications signals that are assembled in accordance with a multiplex specification and have a bit rate within a specified bit-rate range, the method comprising:
    converting of received asynchronous optical signals into electrical signals;
    adapting of the bit rates of the electrical signals by bit stuffing to an integral multiple of an internal clock rate, which multiple is higher than the upper limit of the specified bit-rate range; and
    converting the bit stuffed signals into a specified number of parallel signals having the internal clock rate; and
    switching -the parallel signals with a synchronous electrical switching matrix -that operates at the internal clock rate from any to any port in an arbitrary controlled manner.

* * * * *